March 9, 1937.  L. POTEMKIN  2,072,992
RAKE CONSTRUCTION
Filed Feb. 5, 1934

Inventor
Louis Potemkin
By Nathaniel Frucht
his Attorney

Patented Mar. 9, 1937

2,072,992

UNITED STATES PATENT OFFICE 2,072,992

RAKE CONSTRUCTION

Louis Potemkin, Pawtucket, R. I.

Application February 5, 1934, Serial No. 709,712

1 Claim. (Cl. 55—114)

My present invention relates to improvements in hand rakes, and has particular reference to rakes having flexible tines.

Rakes equipped with flexible tines are light, easily handled by women, and are very effective in use. They have disadvantageous features, however, in that the tines are easily broken or bent, and in that it is difficult to place the rake away, after use, so as to prevent falling of the rake or accidental contact with the tines and resultant damage thereto.

Moreover, it is desirable to provide a rake construction which will permit adjustment of the spaces between the tines, in order to adapt the rake to the user's convenience and to the character of the ground to be raked.

It is the principal object of my invention to provide a rake construction which will allow the tines to be collapsed into snug relation, thus lessening the possibility to damage thereto when the rake is not in use. Preferably, the drawing of the tines into close relation also shortens the entire length of the rake and thus facilitates storing.

It is a further object of my invention to provide an adjustment which permits adjustment of the spaces between the tines, thus increasing the ease and effectiveness of the raking.

Other objects of my invention are to provide a rake which has few parts, easily manufactured and assembled, which is simple to operate and to adjust, and which will hold its position when adjusted.

With the above and other objects and advantageous features in view, my invention consists of a novel arrangement of parts more fully disclosed in the detailed description following, in conjunction with the accompanying drawing, and more specifically defined in the claim appended thereto.

Figure 1:
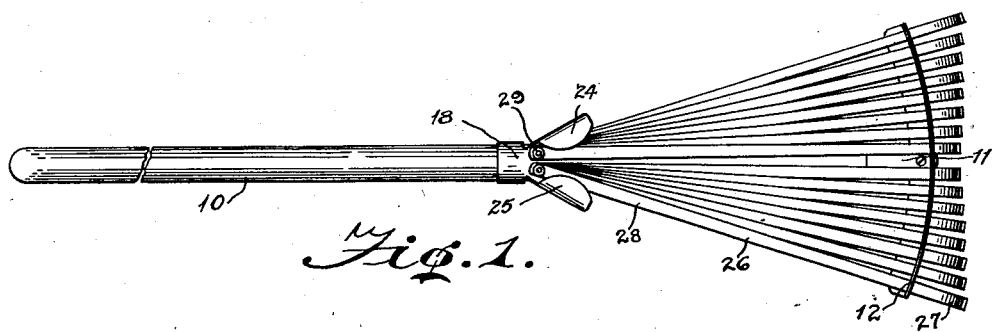
Fig. 1 is a top plan view of the novel rake, in closed position.
Figure 2:
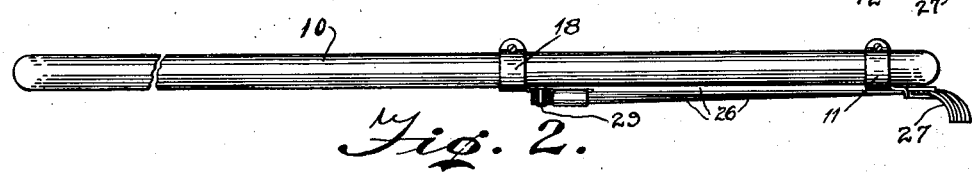
Fig. 2 is a side elevation thereof.
Figure 3:
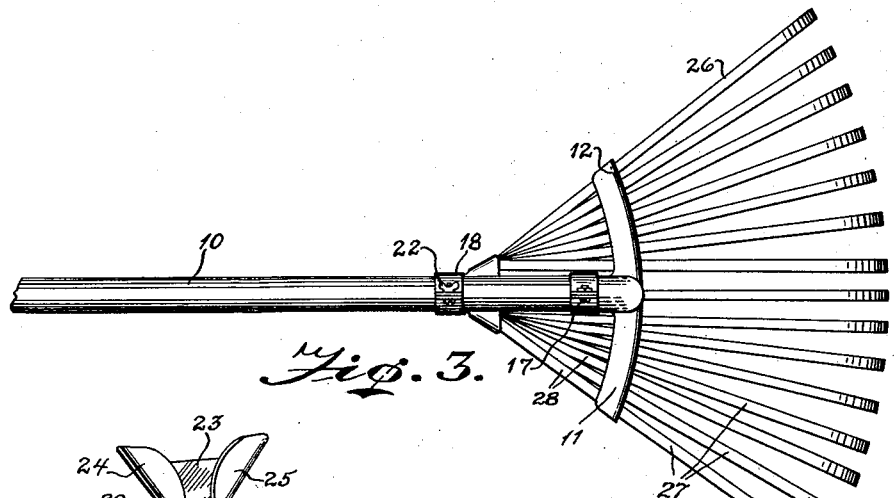
Fig. 3 is a bottom plan view, the tines being spread.
Figure 4:
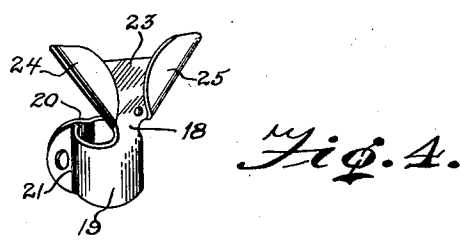
Figs. 4 and 5 are respectively perspective views of the movable tine control and the fixed tine support members.
Figure 5:
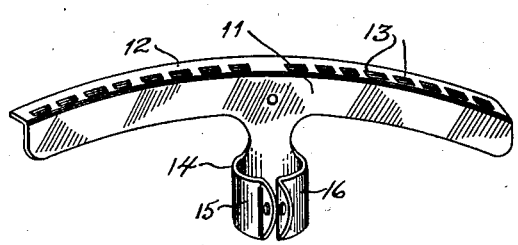

It has been found desirable to provide a rake with flexible tines, which may be extended or closed in as desired. To this end, I have provided a tine support member which supports each tine individually while allowing sliding movment of the tines therethrough, and I have pivotally secured the lower ends of the tines to a movable tine control member, so that the tines may be brought into closely adjacent relation or may be spread apart, by shifting the relative position of the control member to the support member.

Thus, referring to the drawing, the novel rake includes a handle 10, with a tine support member 11 detachably secured at one end thereof, the support member being made of sheet metal and having an arcuate bar 12 provided with a series of spaced tine receiving slots 13, and a sleeve 14 embracing the handle end and formed of two curved sections 15, 16, joined by a lock nut and bolt 17. The support member 13 is preferably locked in place, but is made removable to facilitate assembly and repair.

Adjustably secured to the handle is the control member 18, consisting of a sleeve 19 formed of two curved sections 20, 21 joined by a wing lock nut and bolt 22, and a base 23 of generally triangular shape provided with two protective flanges 24, 25, which also function as stops to prevent excessive outward spreading of the tines. The control member is also preferably made of sheet metal.

The tines 26 are of spring steel, having curved ends 27 for raking; the other ends 28 are locked to the control member as illustrated, the ends on each side of the handle being pierced and riveted as units to the base 23 by means of rivets 29, whereby each tine may slide through its slot 13 and swing on its rivet 29 as the control member is moved along the handle. The protective flanges serve to prevent accidental blows on the rivets. It will be noted that the tines are of varying length, to provide a smoothly arcuate end shape when the tines are in operative, extended position.

When the rake is to be used, the control member is moved until the tines are suitably spaced apart, and is then locked in place; when the rake is to be stored, the control member is released, and moved to draw the tines down, thus closing the rake and reducing its overall length.

It is thus evident that the novel rake utilizes a small number of easily manufactured parts, which are readily assembled, that the tine spaces are adjustable, and that the tines may be closed together for storing, thus facilitating storing and reducing the possibility of breakage or of bending.

While I have described a specific embodiment of my invention, it is obvious that desired changes in the size, the relative arrangement, and the material of the parts, may be made to suit different requirements, without departing from the spirit and the scope of the invention as defined in the appended claim.

I claim:

In a rake, a handle, a tine support member mounted on the end thereof and having tine engaging slots, a tine control member releasably lockingly mounted for adjustable movement on said handle, and a plurality of tines riveted at their ends to said control member and slidably mounted in said support member slots, said control member having flange elements positioned adjacent said riveted tine ends for protection against accidental impacts, and for limiting outward movement of said tines.

LOUIS POTEMKIN.